(12) United States Patent
Nishimura et al.

(10) Patent No.: US 7,850,372 B2
(45) Date of Patent: Dec. 14, 2010

(54) OPTICAL CONNECTOR WITH OPTICAL FIBER

(75) Inventors: Akito Nishimura, Sakura (JP); Takaaki Ishikawa, Sakura (JP); Kunihiko Fujiwara, Sakura (JP); Yukio Hayashi, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 12/389,800

(22) Filed: Feb. 20, 2009

(65) Prior Publication Data

US 2009/0257718 A1 Oct. 15, 2009

(30) Foreign Application Priority Data

Feb. 25, 2008 (JP) .............................. 2008-042440
Dec. 16, 2008 (JP) .............................. 2008-319338

(51) Int. Cl.
G02B 6/36 (2006.01)

(52) U.S. Cl. ...................................................... 385/80

(58) Field of Classification Search ........................ None
See application file for complete search history.

(56) References Cited

U.S. PATENT DOCUMENTS

| 5,625,730 A * | 4/1997 | Ishikawa et al. ............... 385/49 |
| 2006/0088263 A1* | 4/2006 | Tanaka et al. ................ 385/128 |
| 2009/0116793 A1 | 5/2009 | Nishimura et al. |

FOREIGN PATENT DOCUMENTS

| JP | 61-196207 A | 8/1986 |
| JP | 62-104203 U | 7/1987 |
| JP | 63-043111 A | 2/1988 |
| JP | 63-185558 A | 8/1988 |
| JP | 7-209542 A | 8/1995 |
| JP | 11-077507 A | 3/1999 |
| JP | 11-326702 A | 11/1999 |
| JP | 2001-004861 A | 1/2001 |
| JP | 2002-072012 A | 3/2002 |
| JP | 2002-228877 A | 8/2002 |
| JP | 2002-341188 A | 11/2002 |
| JP | 2003-322760 A | 11/2003 |
| JP | 2004-4728 A | 1/2004 |
| JP | 2004-012679 A | 1/2004 |

(Continued)

OTHER PUBLICATIONS

Mizuki Isaji et al, "Development of Optical Fiber Ribbon for optical interconnection" 2007 IEICE symposium, Mar. 7, 2007, p. 501, IEICE, Japan.

(Continued)

*Primary Examiner*—Sung H Pak
(74) *Attorney, Agent, or Firm*—Sughrue Mion, PLLC (57) ABSTRACT

In an optical connector with optical fibers in which silica glass optical fibers with resin coating layers remaining attached are connected in optical fiber openings of a ferrule made from resin, at least a part of the resin coating layer of the optical fiber is glued to an inner face of the optical fiber opening, an outer diameter of the resin coating layer of the optical fiber is less than or equal to 125 μm, and the Young's modulus of the resin coating layer is less than the Young's modulus of the ferrule, and the Young's modulus of the resin coating layer is 1500 to 10000 MPa.

9 Claims, 7 Drawing Sheets

FOREIGN PATENT DOCUMENTS

| | | |
|---|---|---|
| JP | 2004-013105 A | 1/2004 |
| JP | 2004-219567 A | 8/2004 |
| JP | 2004-258193 A | 9/2004 |
| JP | 2004-347832 A | 12/2004 |
| JP | 2009-058847 A | 3/2009 |
| JP | 2009-058848 A | 3/2009 |
| JP | 2009-134262 A | 6/2009 |
| WO | 98/40772 A1 | 9/1998 |

OTHER PUBLICATIONS

Takaaki Ishikawa et al., "High Density Multi-fiber MPO Connector with Fine Optical Fiber for Optical Interconnection" IEICE, Sep. 2007.

* cited by examiner

OPTICAL CONNECTOR WITH OPTICAL FIBER

The present invention claims priority on Japanese Patent Application No. 2008-42440, filed on Feb. 25, 2008, and Japanese Patent Application No. 2008-319338, filed on Dec. 16, 2008, and the contents of which are incorporated herein by reference.

BACKGROUND OF THE INVENTION

1. Field of the Invention

The present invention relates to an optical connector with optical fibers, and in particular it relates to an optical connector with optical fibers in which small diameter optical fibers are connected.

2. Description of Related Art

Single fiber optical connectors and multi-fiber optical connectors are used in optical interconnection techniques. As a multi-fiber optical connector, an MPO type optical connector is widely used (for example, refer to Japanese Unexamined Utility Model Application, First Publication No. S62-104203).

An optical fiber to be inserted in the optical fiber opening of a ferrule of an optical connector is a bare optical fiber in which a resin coating layer is removed from a distal end thereof.

As is known, in an MPO type optical connector, a PC connection (PC: physical contact) is used in which end faces of the optical fibers are butt-coupled to prevent Fresnel reflection due to an air layer.

In response to a requirement for super multiple fibers in the field of optical interconnection, an MPO type optical connector has been developed in which small diameter optical fibers with resin coating layers of 125 μm diameter are inserted into optical fiber openings in a state in which the resin coating layers remain attached (refer to September 2007, Institute of Electronics, Information and Communication Engineers "Super Multi-fiber MPO Connector Using Optical Fibers For Optical Interconnection, Authors: 1 Ishikawa, Kunihiko Fujiwara, Yukio Hayashi").

The small diameter optical fiber used therein has a construction in which a bare optical fiber with a cladding outer diameter of 80 μm is provided with a first coating layer with a high Young's modulus and a colored coating layer (colored layer) with an outer diameter of 125 μm.

An optical connector in which optical fibers on which the resin coating layers remain, are inserted into the optical fiber openings is disclosed for example in Japanese Unexamined Patent Application, First Publication No. 2003-322760 and Japanese Unexamined Patent Application, First Publication No. 2004-258193.

The MPO type optical connector is ground in a convex shape such that the optical fibers protrude from the connecting end face of the ferrule consistently.

However, it is known that the convex grinding process is complicated, and the process control is difficult, so grinding deficiencies, such as an insufficiency of the protruding amount (protruding length) of the optical fibers, dispersion in the protruding amount, angular deficiency of the ferrule end face, and the like, are likely to occur.

In particular in a super multi-fiber optical connector, in which multiple rows of optical fiber openings are arranged in two directions, the area of the connecting end face is large compared with the case where the optical fiber openings are arranged in one row, and hence there is a problem in that grinding defects are likely to occur.

On the other hand, dispersion in the protruding amount of the optical fibers due to grinding defects can be corrected by increasing the connection pressure when the optical connector is connected, in order to equalize the protruding amount.

However, the pressing force (stored spring pressure) of a standard MPO type optical connector is specified to be within a range in which the optical connector will not be damaged. Therefore, in the case where the dispersion in the protruding amount is large, it is difficult to compensate (equalize) completely.

Therefore, in order to compensate for large dispersion in the protruding amount, an optical connector is proposed in which optical fibers are attached to a ferrule without removing their resin coating layers, so that the resin coating layers of the optical fibers serve as a cushioning material against the pressing force (contact force) applied when connecting.

This construction makes it easy for the optical fibers to move toward the optical fiber openings when the pressing force is applied to the ends of the optical fibers, so that optical fibers that protrude excessively are pushed toward the optical fiber openings.

In this manner, due to the large connecting end face and the large number of optical fibers to be connected, even in the case where dispersion occurs in the protruding amounts of the optical fibers, it is possible to optimize the protruding amounts of all optical fibers to realize excellent PC connections.

However, it is proven that if the Young's modulus of the resin coating layer is reduced in order to compensate for great dispersion, conversely the optical connection characteristics deteriorate.

That is, it is proven that if the Young's modulus of the resin coating layer is too high, the resin coating layer loses flexibility, so that its buffering function deteriorates, but conversely, if the Young's modulus of the resin coating layer is too low, the core locations of the ends of the optical fibers are unstable, so that the optical connection characteristics deteriorate.

On the other hand, in a super multi-fiber optical connector, it is required to increase the number of optical fibers to be connected while maintaining excellent connection characteristics.

However, if a ferrule for an MT optical connector is 6.4 mm wide and 2.5 mm thick, for example, the number of optical fiber openings, which is limited by the width, is approximately 12 fibers in practice.

A ferrule of an optical connector type named MINI-MT, conforming to JIS C5984, is 4.4 mm wide and 2.5 mm thick, and since the number of optical fiber openings is limited by the width, it is approximately 4 fibers in practice. In this manner, in a ferrule with a standard shape, the width and thickness of the connecting end face are limited, and there is a limitation to the increase in the number of optical fiber openings. Therefore, it is not possible to significantly increase the number of optical fibers to be connected.

Furthermore, since the internal cavity (adhesive filled cavity) is small, if a large number of optical fibers are inserted forcibly, the optical fibers will be damaged, or optical loss will occur. Therefore, there is a limitation to the number of optical fibers to be connected.

On the other hand, for the optical connector housings for housing ferrules, since internationally there are de facto standards and de jure standards (for example, MPO connector: conformed to JIS C5980), it is difficult to increase the size of the ferrule.

Moreover, in the case where the size of the ferrule is increased, in an application in which a plurality of ferrules is mounted on an optical wiring substrate at a high density, there is a problem in that the packing density of the ferrules drops.

Owing to the above reasons, it is not easy to increase the number of optical fibers to be connected to the ferrule.

Therefore, an optical connector is desired in which the width and thickness of the connecting end face of a ferrule are not excessively larger than those of the standard shape, or which can prevent them getting too large, and in which the number of optical fibers that can be connected is large while having excellent optical connection characteristics.

SUMMARY OF THE INVENTION

An optical connector with optical fibers of the present invention is an optical connector with optical fibers in which silica glass optical fibers with resin coating layers remaining attached are connected in optical fiber openings of a ferrule made from resin, wherein at least a part of the resin coating layer of the optical fiber is glued to an inner face of the optical fiber opening, an outer diameter of the resin coating layer of the optical fiber is less than or equal to 125 μm, and the Young's modulus of the resin coating layer is less than the Young's modulus of the ferrule, and the Young's modulus of the resin coating layer is 1500 to 10000 MPa.

In the optical connector with optical fibers of the present invention, it is preferable that the Young's modulus of a thickest layer forming the resin coating layer is less than the Young's modulus of the ferrule, and the Young's modulus of the thickest layer is 1500 to 10000 MPa.

The Young's modulus of the thickest layer can be 1500 MPa to 3500 MPa.

The optical connector with optical fibers of the present invention may be constructed such that the optical fiber has the resin costing layer on an outer periphery of a cladding layer with an outer diameter of 80 μm, the resin coating layer including a primary coating layer with an outer diameter of 110 μm and a colored resin layer with an outer diameter of 125 μm, and a diameter of the optical fiber opening of the ferrule is 126 to 129 μm.

The construction of the optical connector with optical fibers of the present invention may be such that two alignment member insertion holes, into which alignment members of another optical connector are inserted, are formed in a connecting end face of the ferrule, and the alignment member insertion holes are formed on two sides of the plurality of optical fiber openings.

The construction of the optical connector with optical fibers of the present invention may be such that the ends of the optical fibers are PC ground such that they protrude from the connecting end face of the ferrule.

The construction of the optical connector with optical fibers of the present invention may be such that the optical fibers are inserted into a tubular protective member to be guided into the ferrule, and fastened by adhesive filling an internal cavity of the ferrule, and wirings of the optical fibers in the ferrule have; a converging section converging inside the protective member, a central section which projects from the protective member and extends toward the optical fiber openings while expanding a distance between them, and a mounting section which extends toward the optical fiber openings and has an almost uniform distance therebetween.

The optical connector with optical fibers of the present invention is an optical connector in which silica glass optical fibers are sandwiched and fastened by adhesive between an array substrate having a plurality of optical fiber introducing grooves and a cap section located on the array substrate, and parts of the optical fibers, which are placed in the optical fiber introducing grooves, have resin coating layers remaining attached, an outer diameter of the resin coating layers of the optical fibers is less than or equal to 125 μm, and the Young's modulus of the resin coating layers is less than the Young's modulus of the array substrate and the cap, and the Young's modulus of the resin coating layers is 1500 to 10000 MPa.

DETAILED DESCRIPTION OF THE INVENTION

Hereunder is a description of the best mode for carrying out the present invention, with reference to the drawings.

Figure 6A:
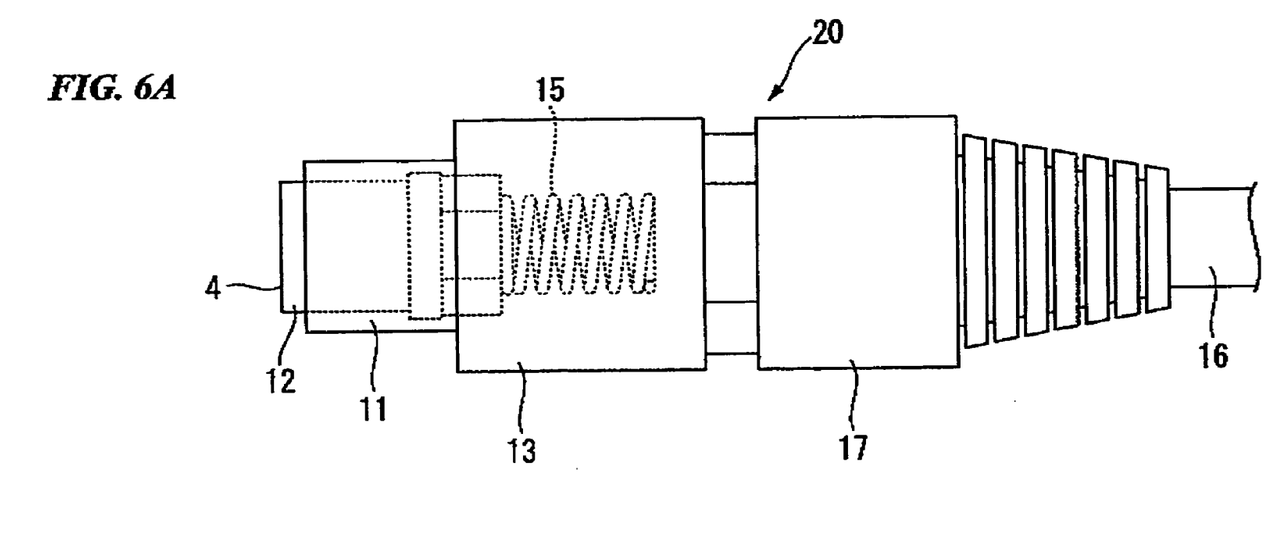
FIG. 6A is a plan view schematically showing an MPO type optical connector in which an example of an optical connector with optical fibers of the present invention is used.
Figure 6B:
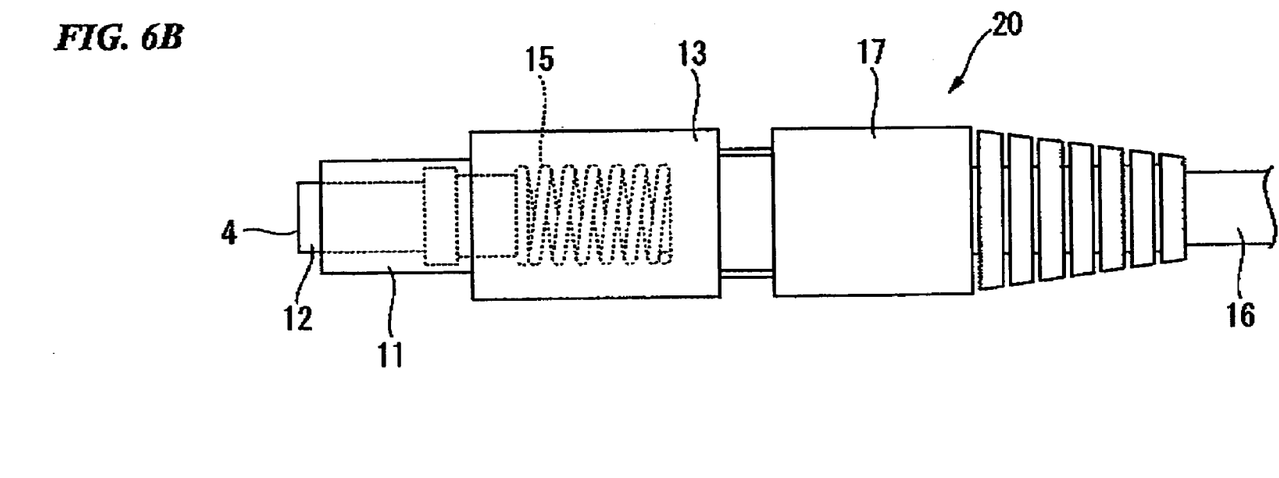
FIG. 6B is a side view schematically showing an MPO type optical connector in which an example of an optical connector with optical fibers of the present invention is used.

As shown schematically in FIG. 6A and FIG. 6B, a multi-fiber optical connector 20 (sometimes referred to hereunder simply as an optical connector) is assembled at the end of an optical fiber 16, and has a ferrule 12, a housing 11 for housing the ferrule 12, a coupling 13 provided on the outside of the housing 11, a spring 15 housed inside of the housing 11, and a boot 17 provided at the rear of the housing 11.

In the following description, the direction toward the left (connection direction) of FIG. 6A is sometimes designated the front while its opposite direction is sometimes designated the rear. Furthermore, the direction (vertical direction of FIG. 1A) corresponding to the short side of the connecting end face 4 of the ferrule 12 is designated the thickness direction, while the direction (horizontal direction of FIG. 1A) corresponding to the long side is designated the widthwise direction.

The spring 15 applies a reactive force against the housing 11, and urges the ferrule 12 forward.

The boot 17 protects the optical fiber 16 from being bent tightly in the vicinity of the rear end of the optical connector 20.

The end of the optical fiber 16 is terminated such that it can be butt-coupled by the ferrule 12. The optical fiber 16 is not limited to a specific type, and can be multi-fiber tape fibers, optical fiber cords, and the like, for example.

As shown in FIG. 1A to FIG. 4, the optical connector with optical fibers shown here has a construction in which the ferrule 12 is assembled at the end of optical fibers 1 leading from multi-fiber tape fibers (hereunder optical fiber tapes) 21 drawn from the optical fiber 16.

Figure 4:
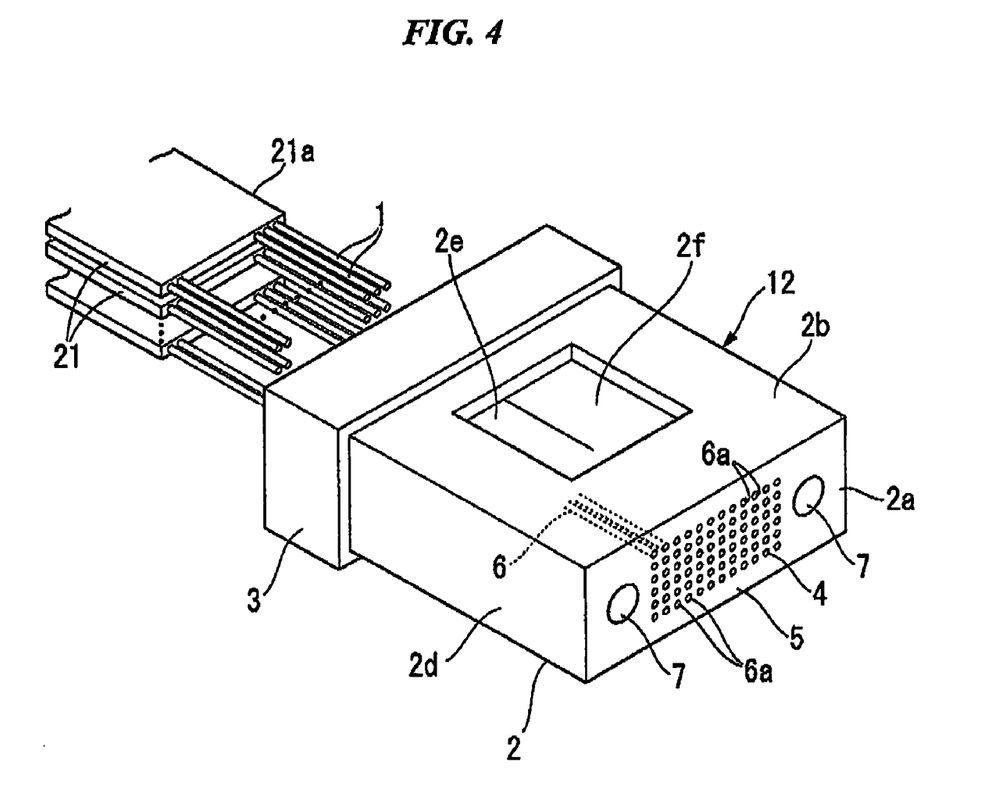
FIG. 4 is a perspective view of the ferrule.

The ferrule 12 has a ferrule body 2 of an almost rectangular shape into which the optical fiber 16 is introduced, and a flange section 3 formed at its rear, whose width is greater than the ferrule body 2.

The ferrule 12 can be integrally molded using a resin such as an epoxy resin filled with silica filler, polyphenylene sulfide (PPS), polybutylene terephthalate (PBT), or the like, for example.

The ferrule body 2 has a top wall part 2b and a bottom wall part 2c, which extend from the long sides of a rectangular joining wall part 2a, and side wall parts 2d, which extend from the short sides.

The front face of the joining wall part 2a is a connecting end face 4 on which the ends of the optical fibers 1 are aligned and fixed such that they can be butt-coupled.

A plurality of optical fiber openings 6 in which the optical fibers 1 are inserted, and guide pin holes 7 (alignment member insertion holes), are formed in the joining wall part 2a. The optical fiber openings 6 are formed from an internal cavity 2e to the connecting end face 4, and the inner face at the end on the internal cavity 2e side is tapered.

Hereunder, the joining wall pan 2a in which the optical fiber openings 6 are formed is sometimes designated an optical fiber opening forming section.

The guide pin holes 7 are formed from the connecting end face 4 to the rear end part of the ferrule 12. The plurality of optical fiber openings 6 and guide pin holes 7 are formed parallel to each other. It is preferable that the pitches of each of the optical fiber openings 6 are the same.

The optical connector 20 as schematically shown in FIG. 6A and FIG. 6B is a push-on type optical connector, which has a similar function to the MPO type optical connector (MPO: Multifiber Push-On), which is specified by JIS C5982.

The external shape of the ferrule 12 resembles the shape of a plug (also called a ferrule or MT ferrule) specified by the abovementioned standard and JIS C5981, and the diameter of the optical fiber openings 6 can be set to 126 to 129 μm according to the abovementioned standard (JIS C5981 or JIS C5982). The tolerance between the diameters of the optical fiber openings is in accordance with the standards.

A resin material (epoxy resin or the like), which is softer than the material (silica glass) forming the optical fiber 1, is used for the ferrule 12.

A ferrule made from resin typically has a Young's modulus of 10000 MPa to 40000 MPa. For example, in an epoxy resin containing silica filler, which is typically used as a resin for ferrules, it is 20000 MPa to 31000 MPa, and in PPS it is 10000 MPa to 15000 MPa.

The connecting end face 4 of the ferrule 12 can be made as a PC (PC: Physical Contact) ground surface.

PC grinding is a grinding process in which the connecting end face 4 and the optical fibers 1 are ground at the same time, so that the optical fibers 1 protrude from the connecting end face 4 of the ferrule 12.

For the PC ground shape of the end of the optical fibers, for example SPC grinding or AdPC grinding, in which the return loss of PC grinding is fiber improved, can be used. Furthermore, it is also possible to project the optical fibers 1 from the connecting end face 4 for concave grinding, and to use flat plane grinding for plane grinding the connecting end face 4. The grinding process and the shape of the ground surface are widely known, and detailed description is omitted.

Figure 2A:
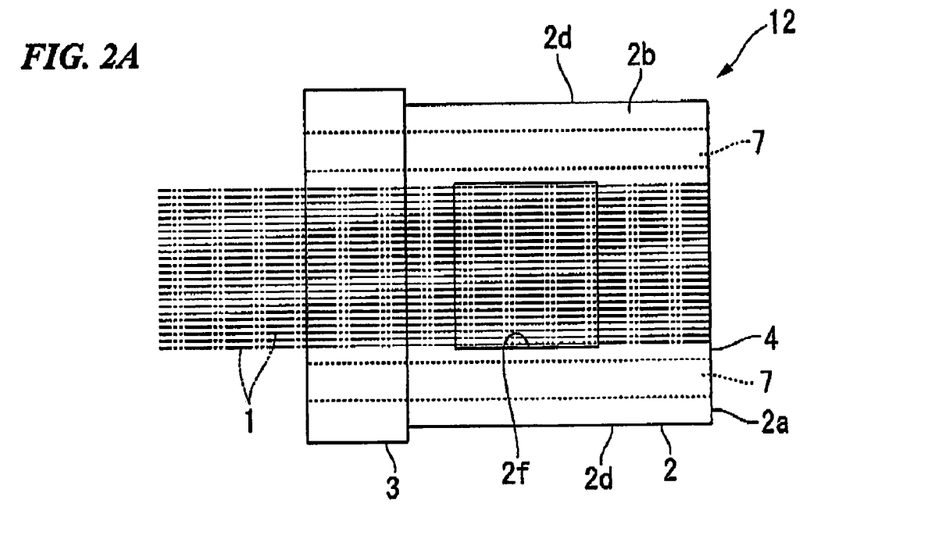
FIG. 2A is a plan view showing a state in which optical fibers are fitted in the ferrule.
Figure 2B:
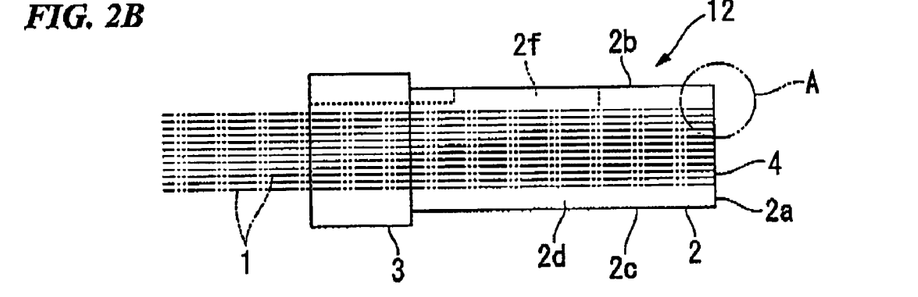
FIG. 2B is a side view showing a state in which optical fibers are fitted in the ferrule.

As shown in FIG. 2A, FIG. 2B, and FIG. 4, a window part 2f to be used for injecting adhesive into the internal cavity 2e of the ferrule 12 is formed in et least either one of the top wall part 2b and the bottom wall part 2c. However, the window part 2f is not essential.

Figure 5:
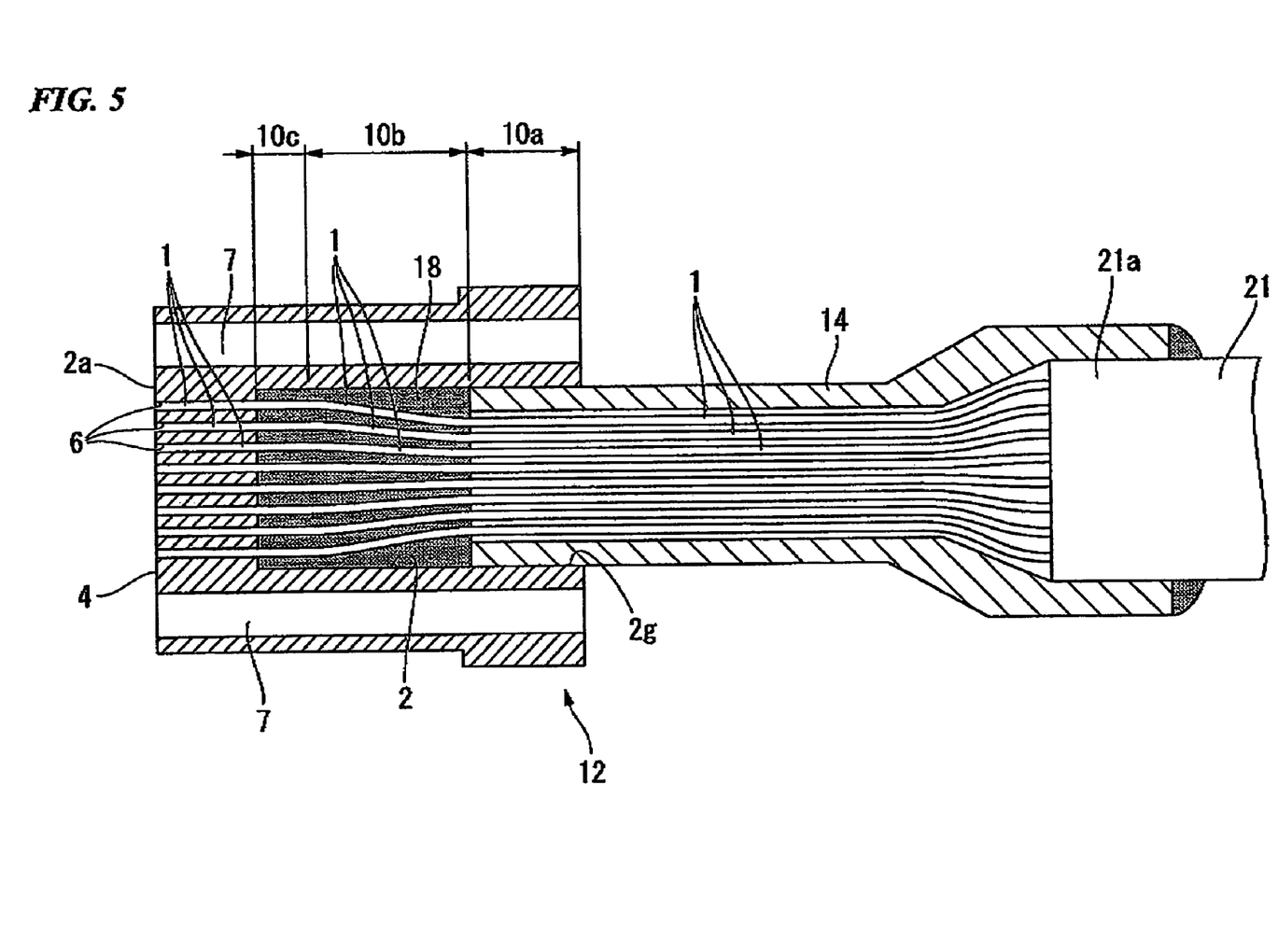
FIG. 5 is a horizontal cross-sectional view of an optical connector with optical fibers, in which optical fibers are connected to the ferrule.

An entry 2g, which is an aperture for introducing the optical fibers 1, is formed on the rear face side of the ferrule 12 (refer to FIG. 5).

FIG. 2A and FIG. 2B are views schematically showing the internal structure of a two-dimensional array type optical connector, and the dimensions, wiring pattern and the like are not accurate.

Figure 1A:
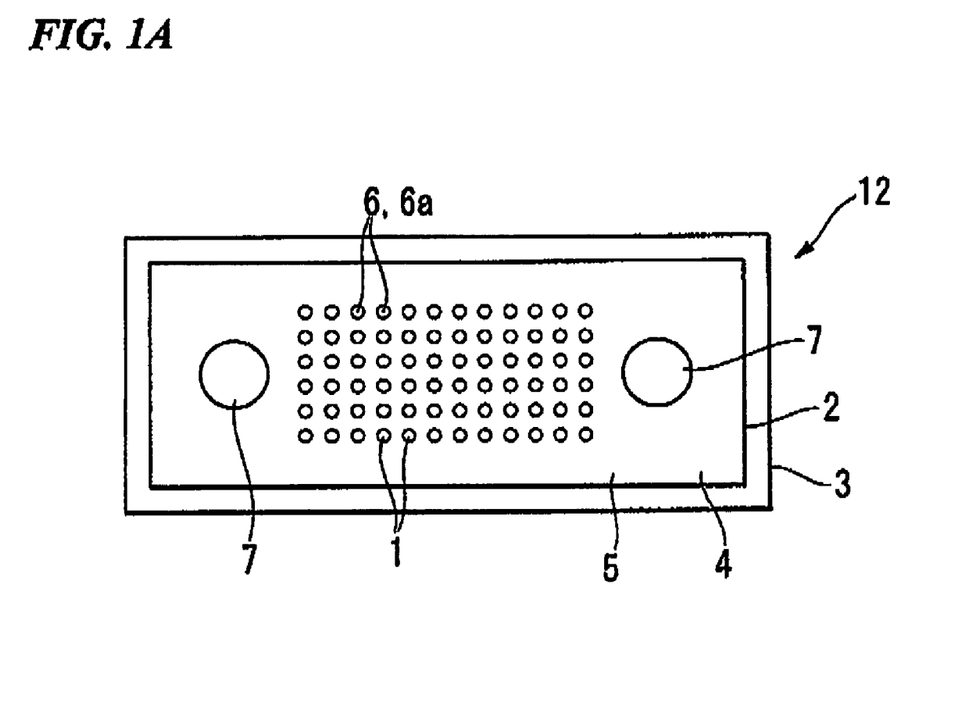
FIG. 1A is a front view showing an embodiment of an optical connector with optical fibers of the present invention.

As shown in FIG. 1A, the apertures 6a of the optical fiber openings 6 are arranged in one or more lines in the connecting end face 4.

As shown in FIG. 4, the plurality of apertures 6a, which are lined up in the widthwise direction, is formed in multiple parallel lines in the thickness direction. To be specific, the apertures 6a are formed in six parallel lines of twelve. That is, the apertures 6a are formed in six rows.

The number of optical fiber openings 6 and the array configuration are not limited to this. For example, 12×2 lines (24 fibers), 12×3 lines (36 fibers), or 12×5 lines (60 fibers) can be used with no limitation.

The number of apertures 6a per one row is not limited to twelve, and it may be four, eight, sixteen, or the like.

Moreover, the optical fiber openings 6 may be arranged such that the location of adjacent rows in the widthwise direction varies.

Metal guide pins for positioning, are inserted into the two guide pin holes 7 formed in the connecting end face 4, which bridge across the connecting end face to another optical connector butt-coupled with the optical connector 20.

In the example in the figure, the guide pin holes 7 are formed on each of the two sides of the optical fiber openings 6. However, the locations of the guide pin holes are not limited by the embodiment.

The guide pin holes can be formed on the top and bottom of the optical fiber openings 6, or at corner sections of the connecting end face 4, in FIG. 1A. It is preferable that the guide pin holes are located in point symmetry relative to the central position of the plurality of optical fiber openings 6 (also the center of the connecting end face 4 in the case of the example in the figure).

Such a point symmetry arrangement of the guide pin holes has been disclosed in the following patent applications, and the descriptions regarding the guide pin holes of the patent applications can be referenced in the present application.

U.S. patent application Ser. No. 12/259,705 (filed in 2008, Title; Optical Connector), Basic Application: Japanese Patent Application No.; Japanese Patent Application No. 2007-280312 (filed on Oct. 29, 2007), Japanese Patent Application No.; Japanese Patent Application No. 2008-234026 (filed on Sep. 11, 2008).

The alignment construction of the multi-fiber optical connector is typically a combination of two guide pin holes and two guide pins. However, it is possible to use other alignment structures.

As another embodiment, there is a construction in which two pin shaped resin protruding sections, which are integrally molded with the ferrule, are provided on the connecting end face, and the protruding sections are inserted into the fitting holes of an optical connector of a mating part for alignment. Furthermore, for another embodiment, there is a construction in which one of the two protruding sections formed on the connecting end face is made to be a pin shaped resin protruding section integrally molded with the ferrule, and the other protruding section is made to be a fitting convex section with a shape other than a pin shape. In this case, it is possible to form a mating receptacle section for receiving the fitting convex section in the connecting end face of the optical connector of the mating part.

Such a fitting convex section and a fitting receiving section have been disclosed in the following patent applications, and the descriptions of the patent applications can be referenced in the present application.

1. Title of the Invention: Optical Connector, Japanese Patent Application No: Japanese Patent Application No. 2007-227259 (filed on Sep. 3, 2007)

2. Title of the Invention: Optical Connector, Japanese Patent Application No: Japanese Patent Application No. 2007-227260 (filed on Sep. 3, 2007)

As shown in FIG. 4, FIG. 6A, and FIG. 6B, the optical fibers 1 are drawn from the optical fiber tapes 21, and introduced into the optical fiber openings 6. Reference symbol 21a denotes a coating to unify the plurality of optical fibers 1.

Figure 3:
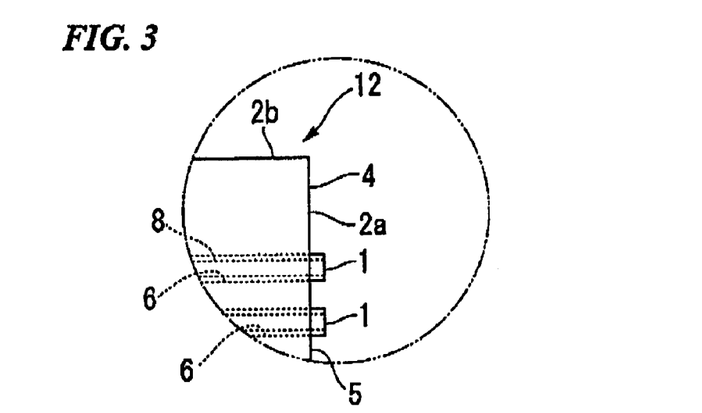
FIG. 3 is an enlarged view of a part A of FIG. 2B.

As shown in FIG. 2A, FIG. 2B, and FIG. 3, the optical fibers 1 are fastened in the optical fiber openings 6, and the ends of the optical fibers 1 protrude from the connecting end face 4 of the ferrule 12.

As shown in FIG. 5, the end of the coating 21a of the optical fiber tapes 21 is introduced into the rear of a tubular protective boot 14 (protective member made of resin). The protective boot 14 encircles the optical fibers 1 to protect them, and extends toward the ferrule 12, and its end is inserted into the entry 2g of the ferrule 12. That is, the protective boot 14 caps the end of the optical fiber tape 21.

The single-core optical fibers 1 leading from the optical fiber tape 21 are inserted into the protective boot 14 to be introduced into the ferrule 12, and project from the end of the protective boot 14 to be introduced into the optical fiber openings 6.

The layout of the optical fibers 1 in the ferrule 12 has a converging section 10a converging inside the protective boot 14, a central section 10b which projects from the protective boot 14, and extends toward the optical fiber openings 6 while expanding the distance between them gradually, and a mounting section 10c which ends toward the optical fiber openings 6 with an almost uniform distance between them.

The mounting section 10c is the section from the end of the central section 10b to the forming part of optical fiber openings 6 (optical fiber opening forming section) in the joining wall part 2a.

The pitch (distance between the central axes of adjacent optical fibers 1) of the optical fibers 1 in the protective boot 14 is smaller than the pitch of the optical fibers 1 in the optical fiber tape 21. Moreover, the pitch of the optical fiber openings 6 (distance between the central axes of adjacent optical fiber openings 6) is greater than the pitch of the optical fibers 1 in the protective boot 14.

The lengths (lengths of the optical fibers 1 in the longitudinal direction) in the central section 10b and the mounting section 10c vary depending on the length of the protective boot 14 inserted into the ferrule 12. For example, if the protective boot 14 is inserted deeply into the ferrule 12, the end of the protective boot 14 gets closer to the joining wall part 2a, so that the central section 10b and the mounting section 10c become shorter.

In this manner, if the distance between the end of the protective boot 14 and the joining wall part 2a becomes small, the curvature of the bending applied to the optical fibers 1 between them becomes great. However, since the optical fibers 1 used in the present embodiment have sufficient mechanical properties and low bending loss properties, there is no damage or great loss occurring.

Optical fibers having superior mechanical properties and low bending loss properties compared with standard optical fibers can be realized by adjusting the fiber cladding ratio and specific refractive index difference $\Delta$.

In the central section 10b and the mounting section 10c, the optical fibers 1 of the optical fibers 1, which are in the locations (location closer to the top and bottom ends in FIG. 5) distant from the center in the widthwise direction, have comparatively greater bending, and the bending of the optical fibers 1 located closer to the center becomes comparatively smaller.

The optical fibers 1 located between the end of the protective boot 14 and the joining wall part 2a are glued and fastened to the ferrule 12 by the adhesive 18 filling the internal cavity 2e of the ferrule 12.

As shown in FIG. 4, the plurality of optical fiber tapes 21 are introduced into the ferrule 12, and the optical fibers 1 leading from the end of the coatings 21a on each of the optical fiber tapes 21 are inserted into the optical fiber openings 6 of the equivalent rows. In the example of the figure, the optical fibers 1 constitute the optical fiber tapes 21. However, a group of single optical fibers may be employed thereinstead.

Figure 1B:
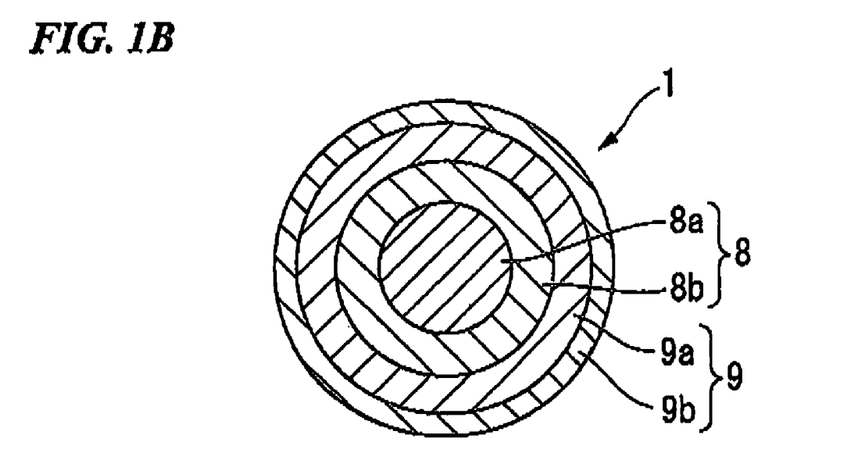
FIG. 1B is a cross-sectional view showing an optical fiber inserted into an optical fiber opening of a ferrule.

As shown in FIG. 1B, the optical fiber 1 includes a bare optical fiber (sometimes referred to hereunder as an optical fiber) 8 and a resin coating layer 9 formed on its outer periphery. The resin coating layer 9 includes a primary coating layer 9a and a colored coating layer 9b formed on its outer periphery. In the resin coating layer 9 in the example of the figure, the primary coating layer 9a is an extra thick coating layer, which is formed so as to be thicker than the colored coating layer 9b.

For the optical fiber 8, silica glass is used, and it is possible to use a single mode optical fiber, a multi mode optical fiber, or the like. Reference symbol 8a denotes the core of the optical fiber 8, while 8b denotes a cladding layer.

The outer diameter of the optical fiber 8, that is, the outer diameter of the cladding layer 8b, can be made to be 80 $\mu$m, for example.

The primary coating layer 9a is an inner circumference section, which is formed such that it covers the cladding layer 8b of the optical fiber 8; and for the resin material forming it, an ultraviolet hardening type resin such as a urethane acrylate system, an epoxy acrylate system, or a butadiene acrylate system can be given as examples.

The Young's modulus of the primary coating layer 9a is made lower than the Young's modulus of the material forming the ferrule 12.

A principle factor for determining the positional variation of the cores of the optical fibers 8 is the Young's modulus of the resin coating layer, and in particular, it is the Young's modulus of the primary coating layer 9a, which is the thickest.

If the Young's modulus of the primary coating layer 9a is too high, as described later, it is difficult to move the optical fiber 8 inside the optical fiber opening 6, so that there is a possibility in that losses in the optical fibers 1 due to dispersion in the protruding amounts at the ends of the optical fibers 1 cannot be reduced.

If the Young's modulus of the primary coating layer 9a is too low, as described later, the optical fiber 8 can easily move excessively inside the optical fiber opening 6, so that there is a possibility in that losses in the optical fibers 1 due to dispersion in the protruding amounts at the ends of the optical fibers 1 increase.

In order to realize stable PC connection in all the optical fibers 1, it is preferable that the Young's modulus of the primary coating layer 9a is 1500 to 10000 MPa, and to be specific, it is most preferable to make it 1500 MPa to 3500 MPa.

As described previously, if the Young's modulus of the primary coating layer 9a is too low, the positioning of the optical fibers 8 inside the optical fiber openings 6 becomes unstable, so that there is a possibility in that when connection pressure is applied between the optical fibers of the mating parts of the optical connectors, the connection becomes unstable, and thereby increasing the losses.

If the Young's modulus of the primary coating layer 9a is too high, as described above, there is concern that the losses in the optical fibers 1 due to dispersion in the protruding amounts at the ends of the optical fibers 1 cannot be reduced.

By setting the Young's modulus within the above range, it is possible to realize stable connection with low losses in all of the optical fibers 1.

The colored resin layer (sometimes called colored costing) 9b, which enhances the ability to identify the optical fibers 1, is a thinner layer than the primary coating layer 9a, and can be formed by an ultraviolet hardening type resin such as a urethane acrylate system, an epoxy acrylate system, a butadiene acrylate system; or the like.

Figure 7:
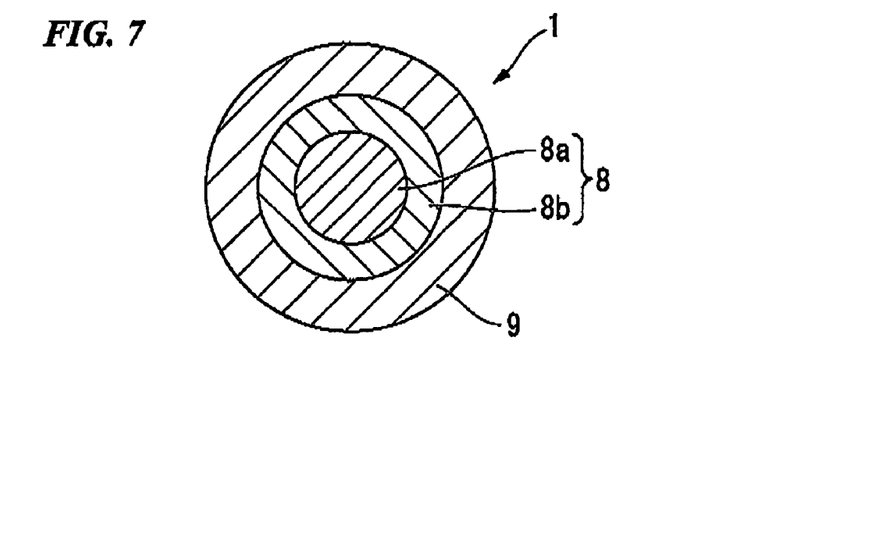
FIG. 7 is a cross-sectional view showing another example of an optical fiber.

As shown in FIG. 7, the optical fiber 1 can be formed without forming the colored resin layer 9b. In this case, the Young's modulus of the whole of the resin coating layer 9 is within the above range.

The outer diameter of the optical fiber 1, that is, the outer diameter of the resin coating layer 9, is preferably 125 μm or less.

By setting the outer diameter of the optical fiber 1 with this range, the pitch of the optical fiber openings 6 can be small, so that it is possible to increase the number of optical fibers 1 connected to the ferrule 12.

The preferable range of the outer diameter of the resin coating layer 9 is 110 μm to 125 μm, and the outer diameter of the primary coating layer 9a can be made to be 110 μm. It is most preferable that the outer diameter of the resin coating layer 9 is 125 μm, and by employing it, the following advantages can be obtained.

For example, for the optical fibers 1, in the case where optical fibers (with resin coatings) with a standard diameter of 250 μm are used, it is necessary to make the diameter of the optical fiber openings 6 to be 250 μm or greater.

However, the standard diameter of the optical fiber opening of the ferrule is 125 μm (126 to 129 μm in practice, because clearance is needed).

Forming an optical fiber opening to a non-standard specification requires significant modifications to the forming mold, equipment, manufacturing process, processing conditions, and the like. As a result, the manufacturing cost would increase, and furthermore, the manufacturing yield would deteriorate.

In contrast, if a narrow optical fiber with the outer diameter of its resin coating layer 9 being 125 μm is used, it can be connected to the optical fiber opening with a diameter of 125 μm directly, so that modifications to the forming mold, equipment, manufacturing process, processing conditions, and the like are reduced.

In this manner, although high density packaging of the optical fibers is possible, it is possible to manufacture an optical connector with excellent optical connection characteristics and low cost.

As shown in FIG. 5, at least a part of each optical fiber 1 inserted into the optical fiber openings 6 is glued and fastened to the inner face of the optical fiber openings 6 by the adhesive 18.

The fact that at least a part is glued and fastened means that there is a case in which the optical fibers 1 are glued and fastened in the longitudinal direction along the whole length of the optical fiber openings 6, and a case in which only the part of each optical fiber 1 is glued and fastened.

When the connecting end faces 4 of a pair of optical connectors 20 are butted, the optical fibers 1 are butt-coupled to each other. By employing this, the optical connectors 20 are optically connected.

At this time, by the guide pins (alignment members) (omitted in the figure) of the optical connector of the mating part being inserted and fitted into the guide pin holes 7, the optical connector 1 is aligned accurately.

As described above, the optical fiber 1 has a primary coating layer 9a made of resin on a part which extends inside the optical fiber opening 6. The pressing force (contact force) of the optical fiber 1 while connecting is adjusted via the elasticity of the primary coating layer 9a.

As a result, the protruding amounts of the optical fibers 1 from the connecting end face 4 are optimized, so that excellent PC connections can be maintained.

Accordingly, in the case where the number of optical fibers 1 is large, problems such as increasing of the optical loss and disconnection are prevented, so that it is possible to maintain stable optical characteristics. For example, it is possible to limit the insertion loss of all of the optical fibers 1 to 0.5 dB or less.

The optical connectors to which the present invention is applied are not limited to optical connectors of types specified by JIS C 5982 or JIS C 5981. The present invention can be applied to all optical connectors that use a PC connection system.

In addition to MPO type optical connectors and MT type connectors, the present invention can be used for MTP, MPX, OGI, and HBMT types.

Furthermore, even if the present invention is applied to a single fiber optical connector, it would demonstrate excellent effects. For single fiber optical connectors, it can be used for an SC type ferrule with a diameter of 2.5 mm as specified by JIS and IEC, or an MU type ferrule with a smaller diameter than the SC type ferrule. Another type of optical connector using a ferrule with a small diameter is an LC type optical connector.

All of these have optical fiber openings with a diameter of approximately 125 μm, and by inserting optical fibers with resin coatings of an outer diameter of 125 μm with the above-described construction into the optical fiber openings, it is possible to realize an excellent PC connection state without applying precision polishing.

Figure 8A:
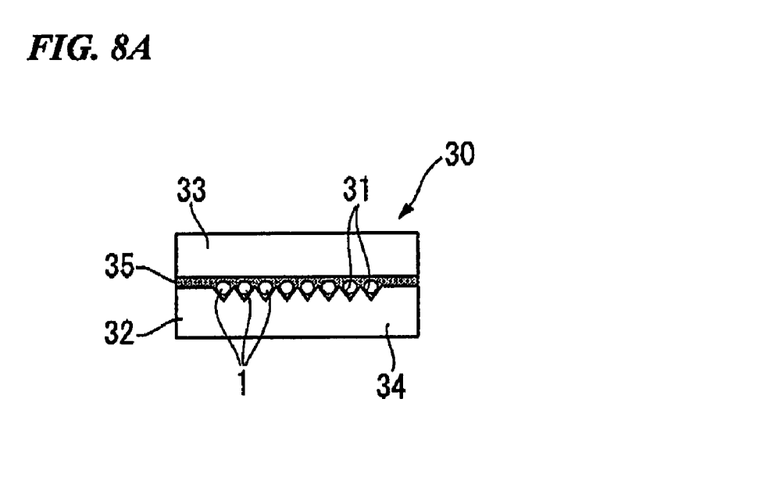
FIG. 8A is a front view showing an example of optical parts of the present invention.
Figure 8B:
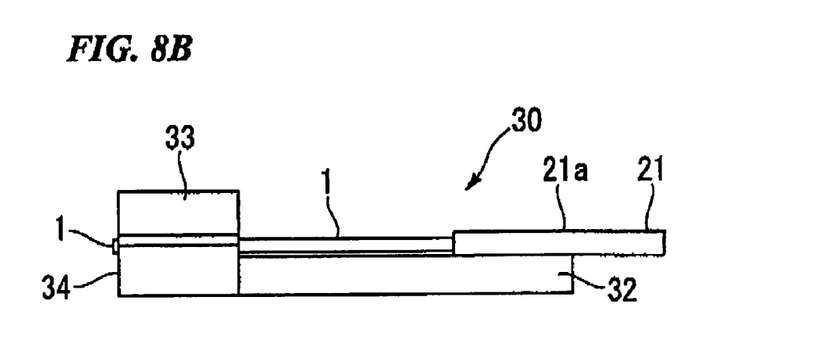
FIG. 8B is a side view showing an example of optical parts of the present invention.

FIG. 8A and FIG. 8B show an optical fiber array 30, which is one example of an optical connector of the present invention.

The optical fiber array 30 is an optical component for fastening the ends of optical fibers, and can be connected to another optical fiber array, another optical component, or the like.

In the following description, the same reference symbols am used for structures common to the optical connector 20 shown in FIG. 1A to FIG. 6B, and the descriptions are omitted.

The optical fiber array 30 has an array substrate 32 having a plurality of optical fiber introducing grooves 31 (alignment grooves with a V-groove shaped cross-section) into which the optical fibers 1 are introduced, and a cap section 33 for sandwiching the optical fibers 1 between itself and the array substrate 32.

The bottom of the cap section 33 is a surface which presses on the optical fibers 1, and its shape can be a flat surface, or an appropriately ridged surface, or the like, matching the profile of the optical fibers.

The front end face of the array substrate 32 and the cap section 33 is a connecting end face 34 to which the ends of the optical fibers 1 are aligned and fastened.

The optical fibers 1 are sandwiched between the array substrate 32 and the cap section 33, and are fastened by an adhesive 35. The ends of the optical fibers 1 are exposed from the connecting end face 34.

In the case where the optical fiber away 30 is PC-connected to another optical fiber array, or an optical component such as another ferrule or the like, it is possible to PC grind the connecting end face 34 of the optical component, and project the optical fibers 1 from the connecting end face 34.

In this case, according to the description of the above-described embodiment, the Young's modulus of the primary coating layer 9a of the optical fibers 1 is 1500 to 10000 MPa, and to be specific it is possible to select it to 1500 MPa to 3500 MPa. By setting the Young's modulus within this range, it is possible to realize stable connection with low losses in the optical fibers 1.

For the primary coating layer 9a, a material is selected whose Young's modulus is less than the Young's modulus of the material forming the array substrate 32 and the cap section 33.

For the material of the array substrate and the cap section, it is possible to use not only a resin material but also a ceramic such as alumina, glass material, or the like.

Furthermore, when the connecting end face 34 of the optical fiber array 30 is PC-connected to another light receiving device, the pressing force of the optical fibers 1 while connecting, is adjusted by elastic distortion of the resin coating layer 9.

Accordingly, the protruding amounts of the optical fibers 1 from the connecting end face 34 are optimized, so that excellent PC connections can be maintained.

Hereunder, the effects of the present invention will be clarified by a specific example.

The optical connector 20 shown in FIG. 1A to FIG. 6B was manufactured as follows.

The construction of the optical fiber 1 was such that a primary coating layer 9a (outer diameter of 110 µm) made of a urethane acrylate system ultraviolet hardening-type resin was provided on the outer periphery of the optical fiber 8 made of solid silica, which had a core 8a (outer diameter of 50 µm) and a cladding layer 8b (outer diameter of 80 µm), and a colored resin layer 9b (outer diameter 125 µm) was provided on its outer periphery.

The Young's modulus of the primary coating layer 9a was as shown in Table 1. In all of the examples, the Young's modulus of the primary coating layer 9a was set to be lower than the Young's modulus of the material forming the ferrule 12.

As shown in FIG. 1A, an optical connector 20 with 72 cores was manufactured, in which six rows of twelve optical fiber openings 6 per row were formed.

The ferrule 12 of the optical connector 20 was made of resin in a rectangular shape, similar to the external appearance of a specified plug (also called a ferrule or MT ferrule) conforming to JIS C5982 and JIS C5981.

The diameters of the optical fiber openings 6 were made to be 126 µm to 129 µm, conforming to the aforementioned standard. An epoxy resin adhesive is filled in the optical fiber openings 6, and the optical fibers 1 were glued to the internal surface of the optical fiber openings 6.

The spacing between the optical fibers and the optical fiber openings was very small compared to the diameter of the optical fiber itself, and the amount of adhesive was also small, so that the influence of the adhesive on the connection characteristics of the optical connector with the optical fibers was very small.

A pair of optical connectors 20 was PC ground (convex ground), connected by pressing together at a specified pressure, and the insertion losses of the optical fibers 1 were measured. Measurement was performed four times, and the maximum insertion losses were recorded. Table 1 shows an example of typical measurement results.

TABLE 1

|  | Young's Modulus (MPa) | Insertion Loss Maximum Value (dB) |
|---|---|---|
| Comparative Example 1 | 500 | 0.8 |
| Comparative Example 2 | 800 | 0.6 |
| Comparative Example 3 | 1000 | 0.18 |
| Example 1 | 2000 | 0.12 |
| Example 2 | 3000 | 0.15 |
| Example 3 | 5000 | 0.16 |
| Example 4 | 7000 | 0.2 |
| Example 5 | 9000 | 0.15 |
| Example 6 | 10000 | 0.16 |
| Comparative Example 4 | 12000 | 0.6 |

From Table 1, it is understood that insertion losses could be kept low by setting the Young's modulus of the resin coating layer 9 to be 1500 to 10000 MPa.

Figure 9:
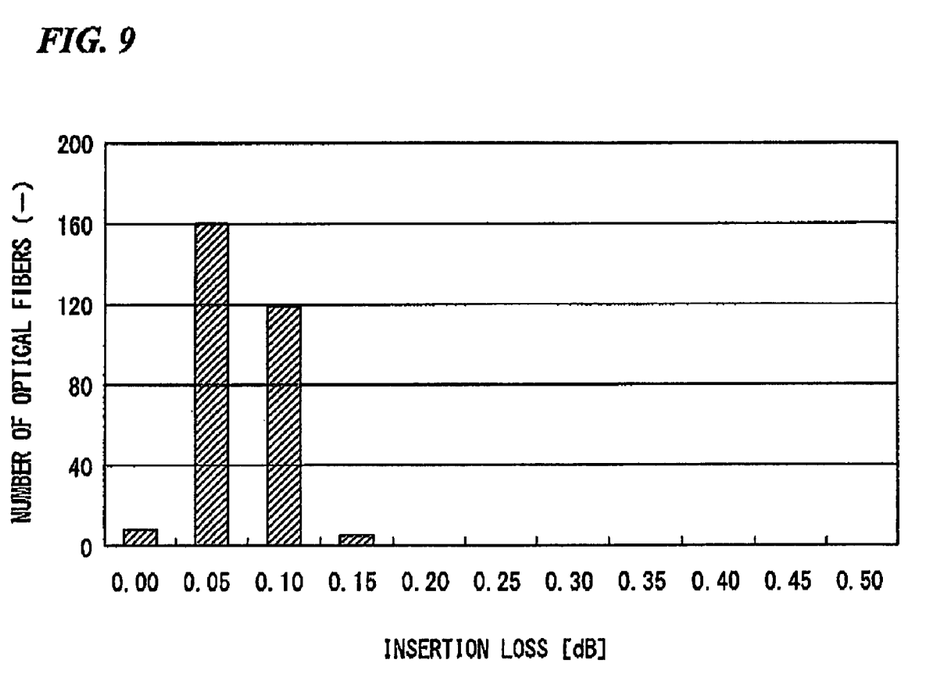
FIG. 9 is a graph showing experimental results.

FIG. 9 shows an example of the results of measuring the insertion losses using the optical connector 20 in which the Young's modulus of the primary coating layer 9a was set to be lower than the Young's modulus of the material forming the ferrule 12, and it shows the values of the insertion losses of each of the optical fibers.

From FIG. 9, it is understood that the insertion losses in all of the optical fibers 1 could be made low by setting the Young's modulus of the primary coating layer 9a to be lower than the Young's modulus of the material forming the ferrule 12.

What is claimed is:

1. An optical connector with optical fibers comprising:
   silica glass optical fibers which are coated with resin coating layers at distal ends of the optical fibers; and
   a ferrule made from resin; wherein:
   the optical fibers are inserted into optical fiber openings of the ferrule;
   the optical fiber openings are arranged on a connecting end face;
   at least a part of said resin coating layer of said inserted optical fiber is glued to an inner face of said optical fiber opening;
   an outer diameter of said resin coating layer of said optical fiber is less than or equal to 125 µm; and
   the Young's modulus of said resin coating layer is less than the Young's modulus of the ferrule, and the Young's modulus of said resin coating layer is 2000 MPa to 10000 MPa.

2. The optical connector with optical fibers according to claim 1, wherein the Young's modulus of a thickest layer forming said resin coating layer is less than the Young's modulus of the ferrule, and the Young's modulus of said thickest layer is 2000 MPa to 10000 MPa.

3. The optical connector with optical fibers according to claim 2, wherein the Young's modulus of said thickest layer is 2000 MPa to 3500 MPa.

4. The optical connector with optical fibers according to claim 1, wherein:
- said optical fiber has said resin coating layer on an outer periphery of a cladding layer with an outer diameter of 80 µm;
- said resin coating layer includes a primary coating layer with an outer diameter of 110 µm and a colored resin layer with an outer diameter of 125 µm; and
- a diameter of the optical fiber opening of said ferrule is 126 to 129 µm.

5. The optical connector with optical fibers according to claim 1, wherein two alignment member insertion holes, into which alignment members of another optical connector of a mating part are inserted, are formed in a connecting end face of said ferrule, and the alignment member insertion holes are formed on two sides of said plurality of optical fiber openings.

6. The optical connector with optical fibers according to claim 1, wherein the ends of said optical fibers are PC ground such that they protrude from the connecting end face of said ferrule.

7. The optical connector with optical fibers according to claim 1, wherein:
- said optical fibers are inserted into a tubular protective member to be guided into the ferrule, and fastened by adhesive filling an internal cavity of said ferrule; and
- wirings of the optical fibers in said ferrule have:
  - a converging section converging inside said protective member;
  - a central section which projects from said protective member and extends toward said optical fiber openings while expanding a distance between them; and
  - a mounting section which extends toward said optical fiber openings and has an almost uniform distance therebetween.

8. An optical connector with optical fibers in which silica glass optical fibers are sandwiched and fastened by adhesive between an array substrate having a plurality of optical fiber introducing grooves and a cap section located on the array substrate, wherein:
- parts of said optical fibers, which are placed in said optical fiber introducing grooves, have resin coating layers remaining attached;
- an outer diameter of said resin coating layers of said optical fibers is less than or equal to 125 µm; and
- the Young's modulus of said resin coating layers is less than the Young's modulus of said array substrate and the cap, and the Young's modulus of said resin coating layers is 2000 MPa to 10000 MPa.

9. The optical connector with optical fibers according to claim 1, wherein:
- a plurality of the optical fiber openings are arranged on the connecting end face; and
- the optical fibers are inserted into each of the optical fiber openings.

* * * * *